United States Patent

Kisor

[15] 3,653,498

[45] Apr. 4, 1972

[54] STATIC CHARGE PROTECTIVE PACKAGES FOR ELECTRON DEVICES

[72] Inventor: Thaddeus William Kisor, Flemington, N.J.

[73] Assignee: RCA Corporation, New York, N.Y.

[22] Filed: Dec. 24, 1970

[21] Appl. No.: 101,316

[52] U.S. Cl. ..........206/46 H, 206/65 F

[51] Int. Cl. ..........B65d 85/00

[58] Field of Search ..........206/46 R, 46 H, 65 F; 174/52; 339/36, 17

[56] References Cited

UNITED STATES PATENTS 3,238,455 3/1966 Jankowski ..........206/65 F 3,441,853 4/1969 Bodine ..........206/65 F 3,454,921 7/1969 Coleman et al. ..........206/46 H

*Primary Examiner*—Allen N. Knowles

*Attorney*—Glenn H. Bruestle

[57] ABSTRACT

A carrier is provided for receipt of an electron device having extending leads, the carrier having an array of grooves for receipt of the leads. A lead contacting member, of electrically conductive material, has a relief pattern of ridges which extend into the grooves and into contact with the leads, thereby shorting together the leads.

4 Claims, 6 Drawing Figures

INVENTOR.
Thaddeus W. Kisor.
BY M. Y. Epstein
ATTORNEY

INVENTOR.
Thaddeus W. Kisor.
BY M.Y. Epstein
ATTORNEY

STATIC CHARGE PROTECTIVE PACKAGES FOR ELECTRON DEVICES

BACKGROUND OF THE INVENTION

This invention relates to electron devices, and particularly to packages used in the handling and shipment of such devices.

Certain electron devices, e.g., semiconductor integrated circuits, comprise an enclosure and a plurality of leads extending outwardly therefrom. The leads are disposed in prearranged array, thus facilitating socketing of the devices.

The devices are relatively small and the leads are of relatively fine size, and, to prevent disarray of the leads, individual ones of the devices are disposed in individual packages having grooves therein for receipt of the leads. The packages are used during testing and in subsequent handling of the devices, including shipments thereof. Preferably, the packages are so inexpensive as to be disposable after a single use.

A problem associated with certain kinds of such devices, particularly those including one or more insulated gate field effect transistors, is that during handling and transport thereof, static electric charge is often generated which can cause severe damage to the devices. It is found that by electrically shorting together all the device leads during handling of the devices up to the very moment when the devices are finally socketed, such damage can be avoided. A difficulty associated with the use of the device packages is that since the devices are electrically tested while within the packages, the packages must provide means for electrically isolating, rather than shorting together, the leads.

A need exists, therefore, for a simple, inexpensive, and disposable package providing means for maintaining the device leads in proper array, means for allowing electrical testing of the devices, and, subsequent to the testing, means for shorting together the leads up to the time immediately prior to the socketing of the devices.

DESCRIPTION OF PREFERRED EMBODIMENTS

Figures 1, 2, 3:
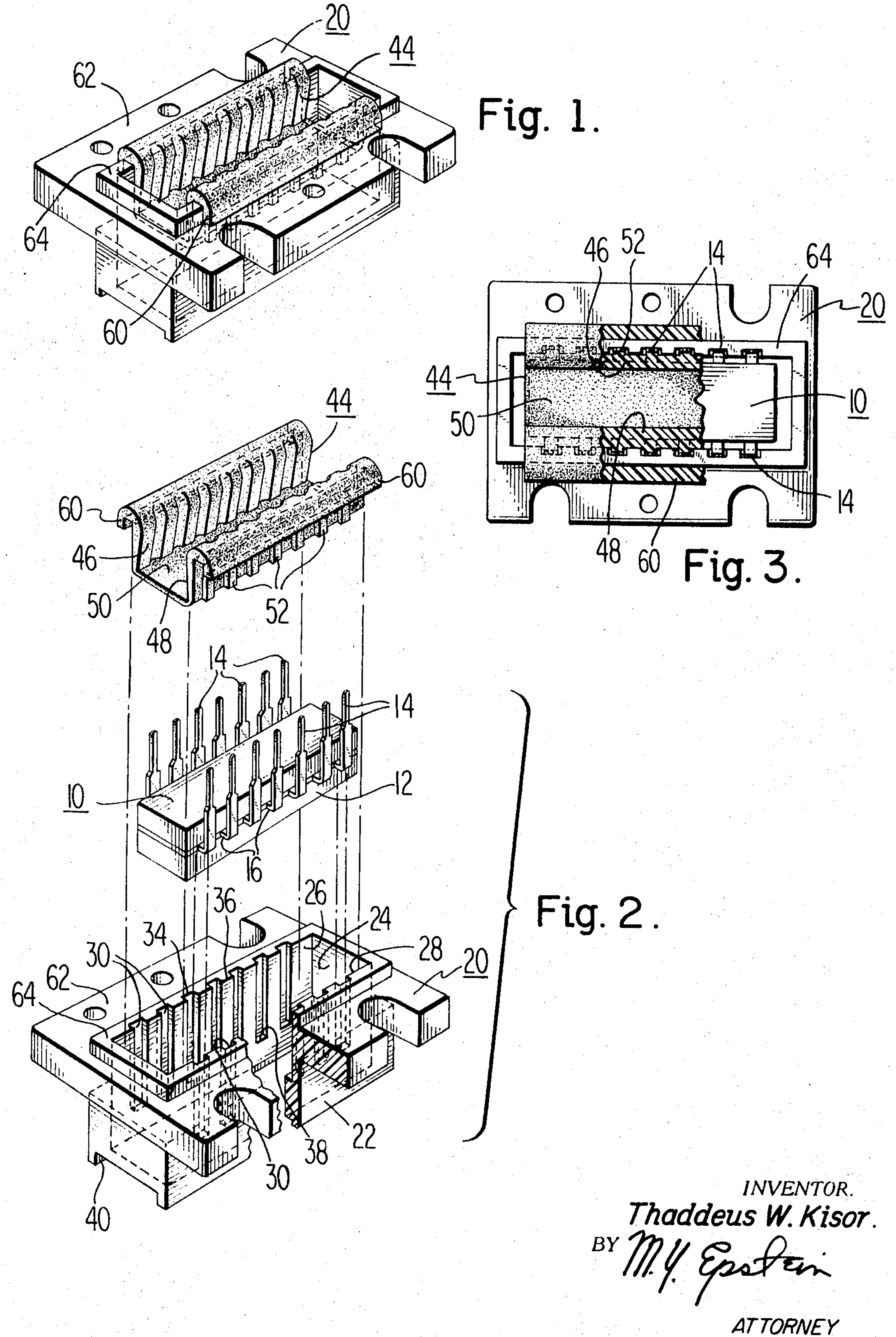
FIG. 1 is a view, in perspective, of a package combination in accordance with the instant invention.
FIG. 2 is an exploded view, in perspective and partly broken away, of the combination shown in FIG. 1 and showing a semiconductor device of the type received within the package.
FIG. 3 is a plan view of the combination shown in FIG. 1, portions of the combination being broken away to show the fit of a semiconductor device therein.

Shown in FIG. 2 is a semiconductor device 10 of one type with which the instant invention has utility. The device, the RCA CD2300, in the instant embodiment, comprises a solid rectangular enclosure 12 of ceramic or plastic, and two sets of leads 14 extending outwardly and away (upwardly, in the drawing) from opposite sides of the enclosure, the outwardly extending portions 16 of the leads providing a lead shoulder.

A carrier 20, part of a package combination in accordance with the invention, for receipt of the device 10 comprises a body 22 of insulating material, e.g., a plastic material such as polysulfone or polypropylene, having a rectangular opening 24 therethrough in which the device 10 is received. Opposite walls 26 and 28 of the opening are each provided with a set of parallel grooves 30, each set of grooves being disposed in an array corresponding to a different one of the arrays of each set of leads 14 of the device 10. In this embodiment, the two sets of leads 14 are disposed in identical array. The grooves 30 have open ends 34 disposed at an edge or lip 36 of the opening 24, and the grooves 30 extend downwardly into the opening 24 to terminate at end walls 38 spaced from the other lip 40 of the opening at the opposite side of the carrier.

Carriers of the type shown are known.

In use, the device 10 is inserted, enclosure 12 first, into the carrier opening 24 through the lip 36 side thereof with each of the leads 14 disposed in a different one of the grooves 30. The position of the device 10 within the opening 24 is determined by the bottoming of the shoulders 16 of the various leads 14 against the groove end walls 38. The device 10, including the leads 14 thereof, is disposed entirely within the opening 24, extending lengths of the various leads 14, however, being exposed within the opening 24 through the open sides of the grooves 30.

To electrically test the device, a probing means, not shown, including suitable lead engaging contacts, is inserted into the opening 24 and into electrical contact with various ones of the exposed leads 14, whereby the electrical characteristics of the device can be determined. Such probing means are known.

For electrically shorting together the various leads 14, to prevent damage of the device by static electric charges, a shorting member 44 is provided. The shorting member 44 comprises a sheet of electrically conductive material formed into a generally U-shape channel having oppositely disposed sides 46 and 48 and a side connecting member 50. The outside surface of each side 46 and 48 is provided with an array of ridges 52, each ridge array being complementary to a different one of the arrays of grooves 30. Stated differently, each shorting member side 46 and 48 has a relief pattern on the outside surface thereof which is the inverse or "negative" of the relief pattern presented by a different one of the grooved walls 26 and 28. Thus, when said shorting member sides are brought into aligned contact with the corresponding walls, as shown in FIG. 3, the various relief patterns "mate" with one another, i.e., the ridges 52 of the shorting member 44 fit snugly within the grooves 30 of the walls.

The dimensions of the shorting member 44 are such, relative to the dimensions of the opening 24, that insertion of the shorting member 44 into the opening automatically aligns the various relief patterns and causes such mating to occur, i.e., the shorting member 44 is designed to have a snug fit within the opening 24. When a device 10 is within the carrier 20, the snug fit of the ridges 52 of the shorting member 44 within the grooves 30 provides contact of the shorting member with the various device leads 14 within the grooves 30, thereby shorting together the various leads through the conductive material of the member 44.

The relative positioning of the member 44 within the opening 24 is determined primarily by the mating relation of the sides 46 and 48 of the member 44 with the opening walls 26 and 28. However, to provide additional control over the disposition of the shorting member 44 within the opening 24, as well as to provide a convenient means for grasping the member 44 for its removal from the carrier 20, the member 44 sides 46 and 48 are each provided with a return-bent flap 60. To cooperate with the flaps 60, the opening walls 26 and 28 extend beyond the surrounding surface 62 of the carrier body 22, thus providing a ridge 64 surrounding the opening 24. The flaps 60 on the shorting member 40 are so shaped as to be snugly disposed about the ridge 64, as shown in FIG. 1, upon insertion of the shorting member 44 into the opening 24, and to thus hold the member 44 snugly in place on the carrier 20.

Preferably, for ease of insertion of the shorting member 44 into the opening 24, while providing for a snug mating fit therebetween, the shorting member 44 is made of a relatively flexible material, e.g., a plastic material such as a co-polymer of polyethylene. To provide the electrical conductivity characteristics desired of the shorting member 44, electrically conductive particles, e.g., carbon, are embedded in the plastic material. Using a shorting member 44 of such plastic material, the member 44 is most easily fabricated using known injection molding or vacuum forming processes. Alternatively, the shorting member can be made from a thin sheet of metal, e.g., aluminum, which is injection molded to the desired shape.

Figures 4, 5, 6:
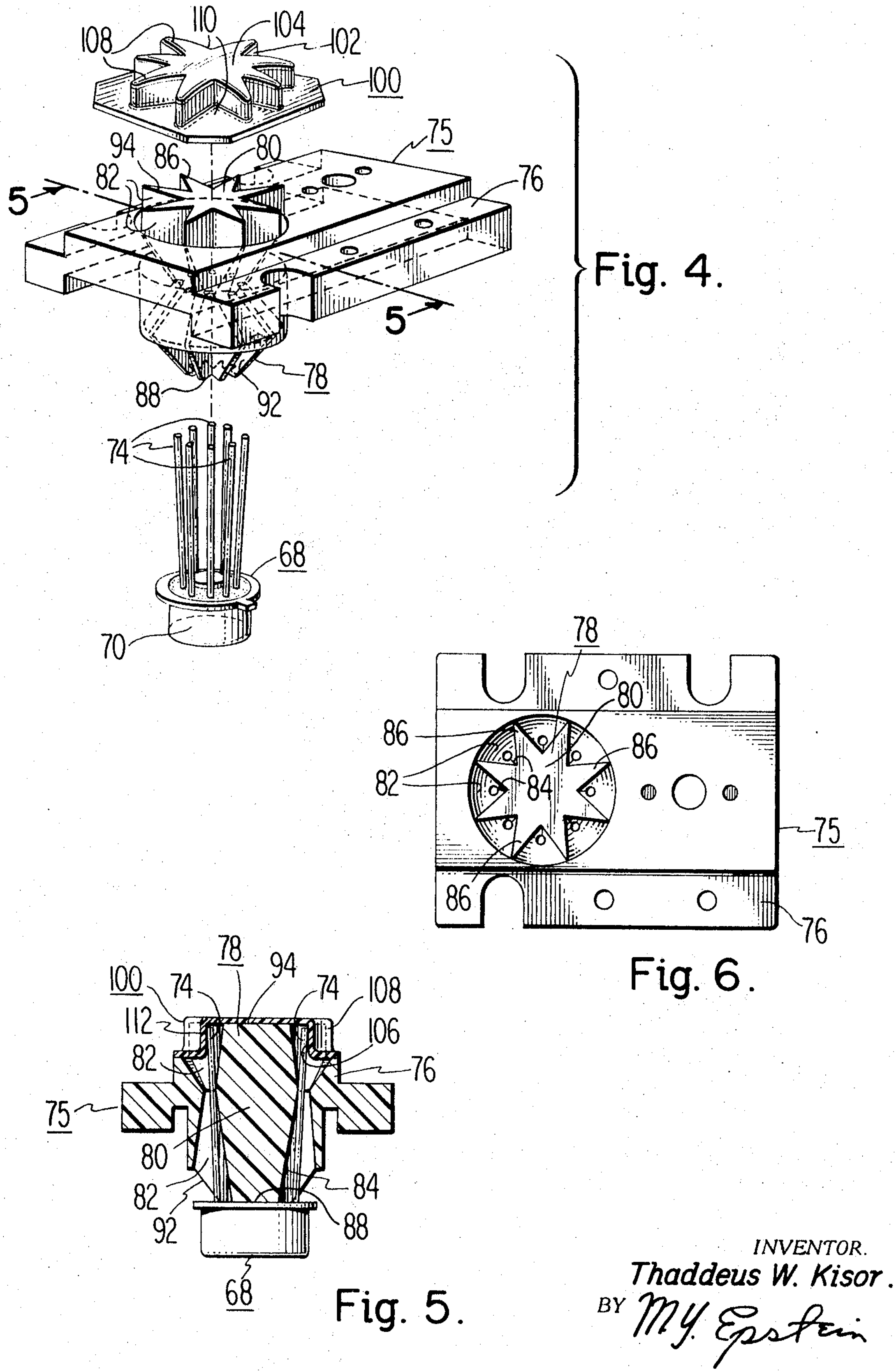
FIG. 4 is an exploded view, in perspective, showing another package combination in accordance with the instant invention, and showing a semiconductor device of the type received by the package.
FIG. 5 is a cross-sectional view, taken along line 5—5 of FIG. 4, showing the package and the semiconductor device in assembled relation.
FIG. 6 is a plan view of a portion only of the combination shown in FIG. 4.

Another embodiment of the invention is shown in FIGS. 4, 5, and 6. This embodiment has utility with an electron device 68 of the type which comprises an enclosure 70 and a plurality of circularly arrayed, parallel leads 74 extending away from one end of the enclosure 70.

The carrier 75, in this embodiment, comprises a body 76 of insulating material, such as the material used for the carrier 20, having a groove assembly 78 which extends transversely through and beyond opposite sides of the body 76. The groove assembly 78 comprises an elongated central stem 80 having a plurality of radially disposed, V-shaped grooves 82 extending along the length of the stem 80, i.e., the bottom sides (apices) 84 (FIG. 6) of the V-shaped grooves 82 are circularly disposed about the stem 80, and the groove walls 86 extend radially outwardly from the stem 80 as well as longitudinally thereof. The grooves 82 are continuous along the length of the stem 80, although the open sides of the grooves 82 are closed by the body 76 where the groove assembly 78 passes therethrough.

When the electron device 68 is mounted on the carrier 75, as shown in FIG. 5, the device leads 74 extend substantially along the entire length of the grooves 82. Between an end 94 of the stem 80 and the body 76, extending lengths of the leads 74 are exposed through the open sides of the grooves 82 when the shorting member 100, hereinafter described, is not in place on the carrier 75. This allows testing of the device 68 while the device is mounted on the carrier 75.

Carriers of the type shown are known.

A shorting member 100 for use with the carrier 75 comprises a sheet of conductive material, such as the material of the shorting member 44, having a star-like, dished configuration with an encircling side 102 and a bottom side 104. The thin wall of the encircling side 102 is shaped to provide a plurality of radially extending V-shaped ridges 108 on the outside of the side 102. The grooves 110 between the ridges 108 form, on the inside of the side 102, a plurality of V-shaped ridges 112 (FIG. 5) which are disposed in an array which is complementary to the array of grooves 82 of the groove assembly 78 adjacent to the end 94 thereof. When the shorting member 100 is mounted on the end 94 of the stem 80, in a "capped" fit therewith, as shown in FIG. 5, the interior ridges 112 extend, in snug fit, into different ones of the grooves 82 through the open sides thereof. With an electron device 68 mounted on the carrier 75, as shown in FIG. 5, the ridges 112 of the shorting member 100 engage the leads 74 within the carrier grooves 82, thereby shorting together the leads.

I claim:

1. A package for use with an electron device including an enclosure and a plurality of leads extending outwardly therefrom, said package comprising:

a carrier of insulating material having an array of grooves thereon for receipt of said leads, said leads being exposed through the open sides of said grooves, and a lead shorting member comprising a sheet of conductive material having a plurality of extending ridges in an array complementary to said array of elongated grooves, whereby, upon disposing of said leads in said grooves and mounting of said shorting member on said carrier, said ridges of said shorting member extend into said grooves of said carrier and contact said leads.

2. The package of claim 1 wherein:

said carrier has an opening therein for receipt of said device enclosure, oppositely disposed walls of said opening each having an array of lead receiving grooves extending towards a lip of said opening, said shorting member has a generally dished configuration including a pair of oppositely disposed sides each having an array of elongated ridges on the outside surface thereof, each of said ridge arrays being complementary to a different one of the groove arrays on said opening walls, and the distance between said sides being substantially equal to the distance between said opening walls, thereby allowing snug mating of said sides with said walls upon insertion of said shorting member into said opening.

3. The combination as in claim 2 wherein:

said carrier includes a ridge disposed along the lip of said opening, and an end portion of said shorting member is return bent in a manner to engage said ridge upon insertion of said member into said opening.

4. The combination as in claim 1 wherein:

said carrier comprises a body and a groove assembly extending transversely through and beyond opposite sides of said body, said groove assembly comprises an elongated stem having an array of grooves disposed about the periphery thereof and extending longitudinally along the entire length thereof, said shorting member has a generally dished configuration including an encircling side wall, said side wall having, on the inside surface thereof, a plurality of inwardly extending ridges disposed in an array complementary to the array of said grooves and, said shorting member is dimensioned to fit on an end of said groove assembly in capped relation therewith with each of said ridges extending into a different one of said grooves in snug fit therewith.

* * * * *